US011868652B2

(12) United States Patent
Shin

(10) Patent No.: US 11,868,652 B2
(45) Date of Patent: Jan. 9, 2024

(54) UTILIZATION BASED DYNAMIC SHARED BUFFER IN DATA STORAGE SYSTEM

(71) Applicant: SK hynix Inc., Icheon-si (KR)

(72) Inventor: Seong Won Shin, San Jose, CA (US)

(73) Assignee: SK HYNIX INC., Icheon-si (KR)

( * ) Notice: Subject to any disclaimer, the term of this patent is extended or adjusted under 35 U.S.C. 154(b) by 164 days.

(21) Appl. No.: 17/185,035

(22) Filed: Feb. 25, 2021

(65) Prior Publication Data
US 2022/0269434 A1    Aug. 25, 2022

(51) Int. Cl.
*G06F 3/06* (2006.01)

(52) U.S. Cl.
CPC .......... *G06F 3/0656* (2013.01); *G06F 3/0611* (2013.01); *G06F 3/0631* (2013.01); *G06F 3/0653* (2013.01); *G06F 3/0683* (2013.01)

(58) Field of Classification Search
CPC .... G06F 3/0656; G06F 3/0611; G06F 3/0631; G06F 3/0653; G06F 3/0683
See application file for complete search history.

(56) References Cited

U.S. PATENT DOCUMENTS

| | | | | |
|---|---|---|---|---|
| 6,657,955 B1* | 12/2003 | Bonneau | ............ | H04Q 11/0478 710/52 |
| 6,671,258 B1* | 12/2003 | Bonneau | ................ | H04L 47/10 370/235 |
| 9,122,614 B1* | 9/2015 | Kesavan | ................ | G06F 3/0689 |
| 11,395,284 B2* | 7/2022 | Baek | .................... | H04L 1/1812 |
| 11,409,454 B1* | 8/2022 | Shveidel | ............... | G06F 3/0635 |
| 2005/0008011 A1* | 1/2005 | Georgiou | .............. | H04L 49/901 370/389 |
| 2009/0248922 A1* | 10/2009 | Hinohara | .............. | G06F 9/5016 711/170 |
| 2018/0143924 A1* | 5/2018 | Fu | ........................... | G06F 13/28 |
| 2019/0073140 A1* | 3/2019 | Yamada | .................. | G06F 3/064 |
| 2019/0104081 A1* | 4/2019 | Kairali | .................... | G06F 3/067 |
| 2019/0310794 A1* | 10/2019 | Eom | .................. | G06F 9/45558 |
| 2019/0332317 A1* | 10/2019 | Danielson | ............ | G06F 3/0685 |
| 2020/0050379 A1* | 2/2020 | Chidambaram Nachiappan | ........ | G06F 3/0683 |
| 2021/0117087 A1* | 4/2021 | Gong | .................... | G06F 3/0659 |
| 2022/0113910 A1* | 4/2022 | Kanno | ................... | G06F 3/0644 |
| 2022/0188000 A1* | 6/2022 | Singh | .................... | G06F 3/0659 |
| 2022/0261185 A1* | 8/2022 | Jung | ..................... | G06F 3/0631 |
| 2022/0269434 A1* | 8/2022 | Shin | ...................... | G06F 3/0653 |
| 2022/0300198 A1* | 9/2022 | Gao | ....................... | G06F 3/0604 |
| 2022/0309067 A1* | 9/2022 | Anand | .............. | G06F 16/24556 |

FOREIGN PATENT DOCUMENTS

WO    2001080016 A2    10/2001

* cited by examiner

*Primary Examiner* — Ramon A. Mercado

(57) ABSTRACT

Disclosed is a method of allocating a buffer memory to a plurality of data storage zones. In some implementations, the method may include comparing a free buffer space size to a reallocation threshold size that is re-allocable at a reallocation cycle, deallocating, upon a determination that the free buffer space size is smaller than the reallocation threshold size, at least a portion of an occupied buffer space size to create a new free buffer space based on a history of buffer memory utilization of the occupied buffer space, and allocating the existing free buffer space and the new free buffer space to targeted data storage zones based on history of buffer memory utilizations corresponding to the targeted data storage zones.

18 Claims, 10 Drawing Sheets

UTILIZATION BASED DYNAMIC SHARED BUFFER IN DATA STORAGE SYSTEM

TECHNICAL FIELD

This patent document relates to allocating buffers for data storage devices.

BACKGROUND

In computer systems such as personal computers, servers and mainframes and mobile devices such as smartphones and tablets, a main memory and a data storage device are coupled to a processor such as a central processing unit (CPU) via a system bus or a local memory bus to provide the CPU access to data stored in the main memory and the data storage device. When data is written to or read from the main memory or the data storage device, a host system sends a write command or a read command to a memory controller. The data that is read from the main memory, or to be written to the main memory or the data storage device, can be temporarily stored in a buffer memory to increase the performance of the main memory and the data storage device by allowing synchronous operations such as file reads or writes to complete quickly instead of waiting for hardware interrupts to access the main memory and the data storage device.

Various memory interfaces use such a buffer memory while moving data between host systems and data storage devices. However, when the data storage device's memory space is divided into multiple sections or zones, efficient buffer allocation becomes very important.

SUMMARY

Embodiments of the disclosed technology relate to methods and systems that, among other features and benefits, provide an algorithm to improve the throughput of a data storage device by improving the utilization of the limited hardware resource such as a buffer memory, in a multi-tenant environment.

In one aspect, a method of allocating a buffer memory to a plurality of data storage zones of a data storage system is disclosed. The method includes receiving a request for allocation of at least part of the buffer memory to hold data to be fed to a first data storage zone of the plurality of data storage zones, determining a free space size of the buffer memory available for allocation for the first data storage zone, comparing the free space size to a reallocation threshold size that triggers reallocating at least a portion of a currently allocated buffer memory space, comparing utilization indices of the plurality of data storage zones including the first data storage zone to a first threshold utilization index and a second threshold utilization index, deallocating, upon a determination that the free space size is smaller than the reallocation threshold size, a portion of a currently allocated buffer memory space that is allocated to at least one of the plurality of data storage zones that has a lower utilization index than the first threshold utilization index, and allocating, upon a determination that the utilization index of the first data storage zone is higher than the second threshold utilization index, the deallocated portion of the buffer memory space to the first data storage zone.

In another aspect, a method of allocating a buffer memory to a plurality of data storage zones of a data storage system is disclosed. The method includes receiving a plurality of requests for allocation of at least part of the buffer memory to hold data to be fed to a plurality of first data storage zones of the plurality of data storage zones, deallocating, upon a determination that a free space size of the buffer memory is smaller than a reallocation threshold size, a portion of a currently allocated buffer memory space that is allocated to at least one of the plurality of data storage zones that has a lower utilization index than a first threshold utilization index, comparing utilization indices of the plurality of first data storage zones to a second threshold utilization index to determine, among the plurality of first data storage zones, high-utilization data storage zones that have utilization indices that are equal to or larger than the second threshold utilization index, comparing the utilization indices of the high-utilization targeted data storage zones with each other to prioritize the high-utilization data storage zones, and allocating the deallocated space and the free space of the buffer memory to the high-utilization data storage zones based on utilization priorities of the high-utilization data storage zones.

In yet another aspect, a data storage system is disclosed. The system includes a data storage device including a plurality of data storage zones configured to store data, a buffer memory configured to be shared by the plurality of data storage zones to temporarily store the data before the data is written to the data storage device, a processor in communication with the data storage device and the buffer memory to receive a request for allocation of at least part of the buffer memory to be allocated to hold data to be fed to a plurality of first data storage zones among the plurality of data storage zones, identify an existing free space size of the buffer memory that is not allocated to the plurality of data storage zones and an occupied space size of the buffer memory that is allocated to at least one of the plurality of data storage zones, compare the free space size to a reallocation threshold size that is re-allocable at a reallocation cycle, deallocate, upon a determination that the free space size is smaller than the reallocation threshold size, at least a portion of the occupied space size of the buffer memory to create a new free space on the buffer memory based on a history of buffer memory utilization of the occupied space, and allocate the existing free space and the new free space of the buffer memory to the plurality of first data storage zones based on a history of buffer memory utilization corresponding to the plurality of first data storage zones.

DETAILED DESCRIPTION

Figure 1:
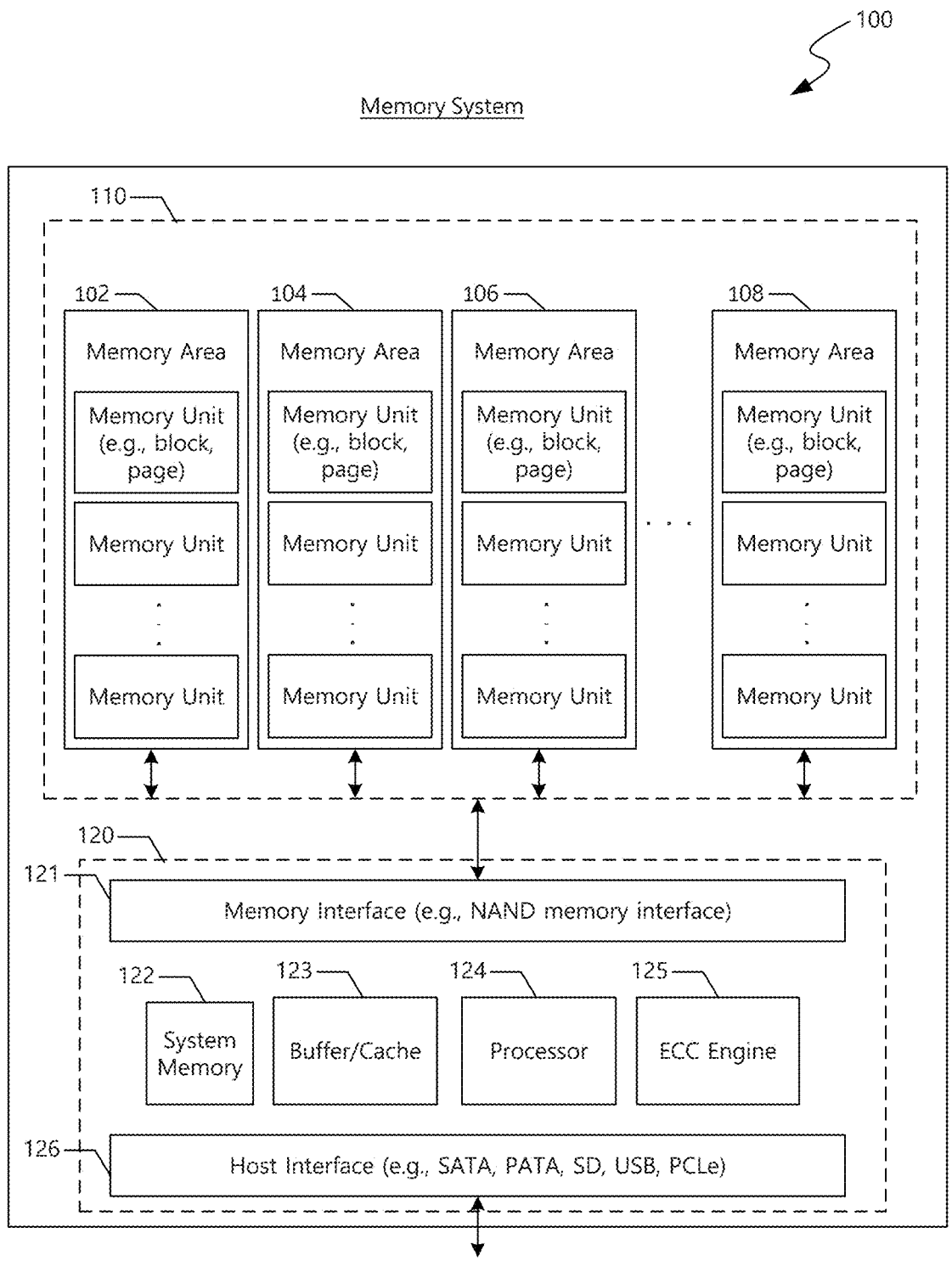
FIG. 1 illustrates an example of a memory system that can be utilized for implementing some embodiments of the disclosed technology.

FIG. 1 illustrates an example of a memory system 100 that can be utilized for implementing some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, or 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a bank, block, or page that can be identified by a unique address such as bank address, block address, and page basis address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 111 can be configured to store at least one bit of information (e.g., one bit of information or multiple bits of information), and each of the memory cells in memory area 112 can be configured to store more than one bit of information.

As shown in FIG. 1, the memory system 100 includes a controller module 120. The controller module 120 includes a memory interface 121 to communicate with the memory module 110, a host interface 126 with communicate with a host (not shown), a processor 124 to executes firmware-level code, and buffers/caches and memories 122 and 123 to temporarily or persistently store executable firmware/instructions and associated information. In some implementations, the controller unit 120 can include an error correction engine 125 to perform error correction operation on information stored in the memory module 110. Error correction engine 122 can be configured to detect/correct single bit error or multiple bit errors. In another implementation, error correction engine 125 can be located in the memory module 110.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

The controller module 120 may include an error correction code (ECC) engine 125 that is configured to receive data to be written to the plurality of memory areas 102, 104, 106, 108 and to generate a codeword. For example, the ECC engine 125 may include an encoder configured to encode data using error correction codes such as a low-density parity check (LDPC) encoder.

The ECC engine 125 may also be configured to receive data and to process the received data using the error correction codes such as the LDPC decoder. The LDPC decoder may be configured to decode data read from the plurality of memory areas 102, 104, 106, 108 to detect and correct, up to an error correction capability of the ECC scheme, one or more bits of errors that are present in the data.

Figure 2:
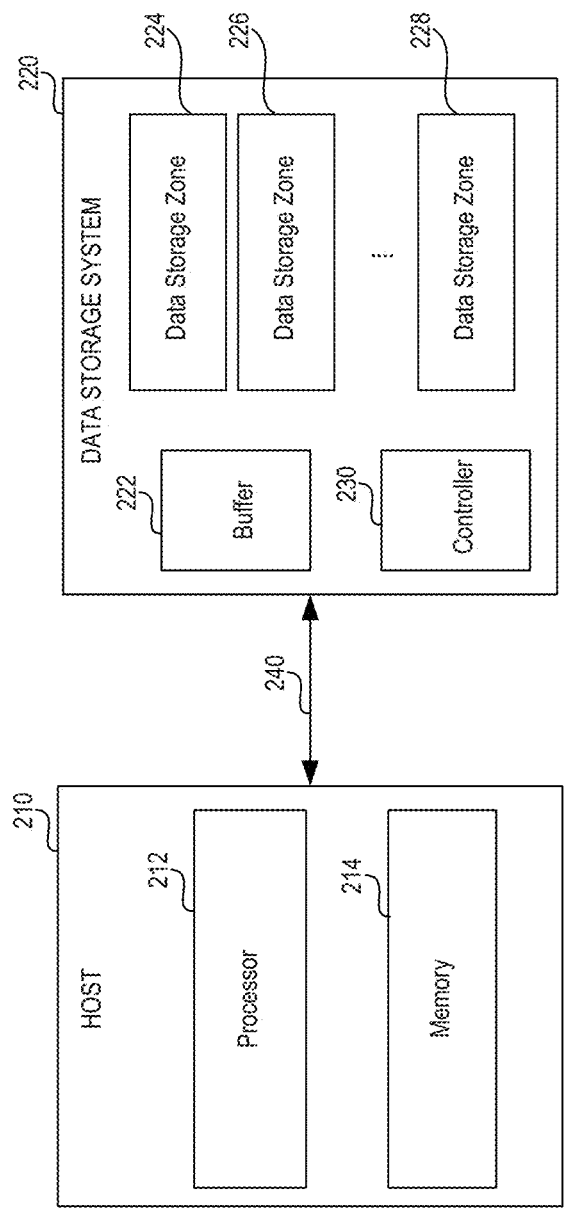
FIG. 2 illustrates an example configuration of a host system and a data storage system in communication with the host system that can be used to implement some embodiments of the disclosed technology.

FIG. 2 illustrates an example configuration of a host 210 and a data storage system 220 in communication with the host system that can be used to implement some embodiments of the disclosed technology.

The host 210 can be a device or a system that includes one or more processors 212 that operate to retrieve data from the data storage system 220 or store or write data into the data storage system 220. In some implementations, examples of the host can include a personal computer (PC), a portable digital device, a digital camera, a digital multimedia player, a television, and a wireless communication device. The host 210 may also include a memory 214 to store information needed for operating the data storage system. The host 210 can communicate with the data storage system 220 through a communication channel 240 such as a system bus or a wired/wireless network. As will be discussed below, the memory 214 may be used to store information associated with the utilization of the buffer allocated to the data storage system 220.

The data storage system 220 includes a plurality of data storage zones 224, 226, 228 that can be used to store information for use by the host 210. In some implementations, the data storage system 220 may include the memory system 100 illustrated in FIG. 1. The data storage system 220 may also include a buffer 222 configured to be shared by the plurality of data storage zones 224, 226, 228. In some implementations, the buffer 222 may be used to store data that is read from the plurality of data storage zones 224, 226, 228 or will be written to the plurality of data storage zones 224, 226, 228 when the data is written from or read by the host 210. Although FIG. 2 illustrates the buffer 222 as being in the data storage system 220 by way of example, the buffer 222 may be located outside the data storage system 220.

In some implementations, the memory cell array can include NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

In an implementation, the data storage system 220 may also include a controller 230 that is used to allocate the buffer 222 to queues associated with the plurality of data storage zones 224, 226, 228. To this end, the controller 230 may maintain information associated with the utilization of the buffer 222 allocated to the plurality of data storage zones 224, 226, 228. In another implementation, such a controller 230 may be outside the data storage system 220.

In some implementations, the buffer 222 (or cache) may be divided into multiple portions and each portion of the buffer 222 be assigned to each data storage space, such as to one of the plurality of data storage zones 224, 226, 228.

The controller 230 may include any type of controller or processor that can provide the functions described herein. Examples of the controller 230 may include a microprocessor, a digital signal processor, a memory controller, a device controller and a computational engine within an electronic device.

In some implementations, the controller 230 may be operable to allocate portions of the buffer 222 to the data storage zones 224, 226, 228 based on utilization indices associated with the data storage zones 224, 226, 228 being accessed. In some implementations, the utilization indices can indicate the percentage of the buffer memory that is presently in use or has been in use versus the total buffer memory space that has been allocated to a certain data storage zone. In one example, the utilization indices may include history of buffer memory utilizations corresponding to the plurality of data storage zones 224, 226, 228 being accessed.

In some embodiments of the disclosed technology, the controller 230 may be operable to receive a request that requires at least part of the buffer 222 to be allocated to hold data to be fed to a targeted data storage zone (e.g., 224, 226, or 228). The controller would then determine a free space size of the buffer 222 available for allocation for the targeted data storage zone, and compare the free space size to a reallocation threshold size. The reallocation threshold may indicate that reallocating at least a portion of a currently allocated buffer memory space is required. The controller can compare utilization indices of the plurality of data storage zones (including the targeted data storage zone) to a first threshold utilization index and a second threshold utilization index. Upon determining that the free space size is smaller than the reallocation threshold size, the controller can deallocate a portion of a currently allocated buffer memory space that is allocated to at least one of the plurality of data storage zones 224, 226, 228 that has a lower utilization index than the first threshold utilization index. Upon determining that the utilization index of the first data storage zone is higher than the second threshold utilization index, the controller can allocate the deallocated portion of the buffer memory space to the first data storage zone. The request includes a command from an SSD host for a buffer allocation. The request may also include a first command for an open zone for initial buffer allocation. In this patent document, the term "open zone" can be used to indicate a zone of the data storage device that is active at a given time. For example, the open zone may include erased (empty) memory cells and/or partially programmed memory cells that are available for further writes by the hosts. By contrast, full zones do not allow data to be written to since all the memory cells therein are fully programmed.

In some embodiments of the disclosed technology, the controller 230 may, upon determination that the free space size is equal to or larger than the reallocation threshold size, allocate a free buffer memory space corresponding to the free space size to the one or more of the plurality of data storage zones on which the one or more requests are queued to run at a reallocation cycle. Here, the reallocation threshold size corresponds to a predetermined buffer memory size that is smaller than a total size of the buffer and set to be re-allocable at a reallocation cycle. Such a reallocation cycle is periodically repeated. In some implementations, which zone is allocated to the command from a host and whether a buffer space is needed to execute the command on the zone may be determined at each reallocation cycle. The allocated buffer may be periodically monitored to determine whether to deallocate/reallocate the buffer space, and a new buffer space (e.g., deallocated buffer) is allocated based on buffer utilization monitoring.

In some embodiments of the disclosed technology, the controller 230 may be operable to receive a plurality of requests for allocation of at least part of the buffer 222 to hold data to be fed to the plurality of data storage zones. Upon determining that a free space size of the buffer is smaller than a reallocation threshold size, the controller would then deallocate a portion of a currently allocated buffer memory space that is allocated to at least one of the data storage zones that has a lower utilization index than a first threshold utilization index. The controller can compare utilization indices associated with the plurality of data storage zones to a second threshold utilization index to determine high-utilization targeted data storage zones that have utilization indices that are equal to or larger than the second threshold utilization index. The controller can also compare the utilization indices associated with the high-utilization targeted data storage zones with each other to prioritize the high-utilization targeted data storage zones. The controller can allocate the deallocated space and the free space of the buffer to the high-utilization targeted data storage zones based on utilization priorities of the high-utilization targeted data storage zones.

In some implementations, the reallocation threshold size corresponds to a predetermined buffer memory size that is smaller than a total size of the buffer memory and set to be re-allocable at a reallocation cycle. In some implementations, the utilization indices associated with the plurality of targeted data storage zones are determined based on utilization rates of portions of the buffer memory allocated to the plurality of data storage zones. In some implementations, the first and second indices are determined based on a history of buffer memory utilization corresponding to the plurality of data storage zones. In one example, the first and second threshold utilization indices may have the same value as each other. In another example, the first and second threshold utilization indices may have different values from each other. In some implementations, the first threshold utilization index has a smaller value than the second threshold utilization index.

In some embodiments of the disclosed technology, the controller may be operable to allocate the deallocated space and the free space of the buffer memory to a high-utilization targeted data storage zone having the highest utilization rate among the high-utilization targeted data storage zones.

In some embodiments of the disclosed technology, the controller may be operable to receive a request for allocation of at least part of the buffer memory to hold data to be fed to a plurality of targeted data storage zones among the plurality of data storage zones. The controller would then identify an existing free space size of the buffer memory that is not allocated to the plurality of data storage zones and an occupied space size of the buffer memory that is allocated to at least one of the plurality of data storage zones. The controller can compare the free space size to a reallocation threshold size that is re-allocable at a reallocation cycle. Upon determining that the free space size is smaller than the reallocation threshold size, the controller can deallocate at least a portion of the occupied space size of the buffer memory to create a new free space on the buffer memory based on a history of buffer memory utilization of the occupied space. The controller can allocate the existing free space and the new free space of the buffer memory to the plurality of targeted data storage zones based on history of buffer memory utilizations corresponding to the plurality of targeted data storage zones.

In some implementations, the history of buffer memory utilizations corresponding to the occupied space includes utilization rates of portions of the buffer memory previously allocated to the plurality of data storage zones. In some implementations, the occupied space size is deallocated upon determination that a previous utilization of the occupied space is lower than a threshold utilization value. In some implementations, the history of buffer memory utilizations corresponding to the plurality of targeted data storage zones includes utilization rates of portions of the buffer memory previously allocated to the plurality of targeted data storage zones. In some implementations, the existing free space and the new free space of the buffer memory is allocated to a targeted data storage zone upon determination that a previous utilization of the buffer memory associated with the targeted data storage zone is higher than a threshold utilization value. The reallocation cycle is periodically repeated.

Some examples of the data storage system 220 include a solid-state drive (SSD), which is a data storage device that utilizes non-volatile memories (e.g., flash memory) and/or volatile memories (e.g., synchronous dynamic random access memory; SDRAM) to store data. For example, the data storage system 220 may include a plurality of flash memory devices using multi-level cell technology. Each memory device includes a plurality of memory blocks, and each of the plurality of memory block includes a plurality of memory cells. Each memory cell can be programmed into one of a plurality of program states. The data stored in each memory cell can be read out using a plurality of read thresholds. The data storage device implemented based on some embodiments of the disclosed technology is configured to ensure that the data can be decoded using optimized decoder parameters.

In some implementations of the disclosed technology, the throughput of a Solid State Disk (SSD) is enhanced by utilizing a method that maximizes, or improves, the utilization of the limited hardware resource, especially in multi-tenant environment of SSDs.

Typical performance metrics of enterprise SSDs are the throughput in MB/s, or the input-output (IO) operations per second (IOPs). Among numerous limiting factors of the maximum throughput, hardware resources such as DRAM or SRAM volatile memory buffer size is fixed by a hardware design with a limited available size.

As noted earlier, a buffer memory (e.g., RAM buffer) is used as a temporary buffer for the SSD user data before written to the non-volatile device such as NAND to avoid NAND's head-of-line blocking especially during its slow write or program operation. Usually the buffer is much more expensive than NAND and is available only with a fraction of the actual NAND size. Usually the fraction is much less than $1/1000$ of NAND capacity. In some implementations, a buffer memory is statically allocated among different requestors of the SSD without fully utilizing the nature of the requestors.

In some implementations, the data storage system may include a data storage space that is divided into a plurality of data storage zones. For example, the data storage system implemented based on some embodiments of the disclosed technology may include newer SSD types such as Zoned Namespace (ZNS) drive, which enables the host of the SSD to allocate a smaller SSD segment (e.g., a zone or aggregation of multiple zones) for a specific requestor application with a finer grain differentiation with the others. However, a requestor that is allocated with an SSD segment and a corresponding buffer memory space may not fully utilize the allocated buffer memory space for the duration of the request.

In this patent document, such a requestor application is sometimes referred to as a "tenant." The disclosed technology can be used in some implementations to provide a method that strives to maximize the utilization of the buffer memory space in a multi-tenant environment of SSDs. For example, a pre-allocated buffer area that is unused because the corresponding zone is idle can be reallocated, thereby improving the utilization of the buffer memory space when multiple tenants are allowed to perform any operations for multiple zones independently. In some implementations, the method may dynamically change the buffer allocation based on the workload activity or utilization detection of such a segment.

In some implementations, the method is applicable when the host and the SSD in the system exchanges command requests and completions via predefined queue structures. In an implementation, the SSD may include NVMe (Non-Volatile Memory Express) ZNS SSD. In another implementation, the disclosed method is applicable to different type SSDs.

In an NVMe SSD, IO command queues are paired as a Submission Queue (SQ) and a Completion Queue (CQ). The host knows the completion of a command via one or more CQ status changes made by the SSD. Upon recognizing the CQ changes, the host puts one or more new commands into a SQ to maintain the predefined number of the queue entries for the SSD to process. The repetition of such command operations via the queue entries is considered as workloads to the SSD. These workloads become an input to multiple segments of the SSD.

The disclosed technology can be used in some implementations to provide a utilization based dynamic shared buffer (UDSB) technique that periodically controls the buffer allocation to each segment workload per its utilization detection. In some implementations, the USDB technique periodically de-allocates a unit buffer resource from the already allocated request if the utilization of the buffer is below a threshold. In some implementations, the USDB technique periodically allocates a unit buffer resource to the request if the utilization of the buffer allocated to the existing request is above a threshold.

Figure 3:
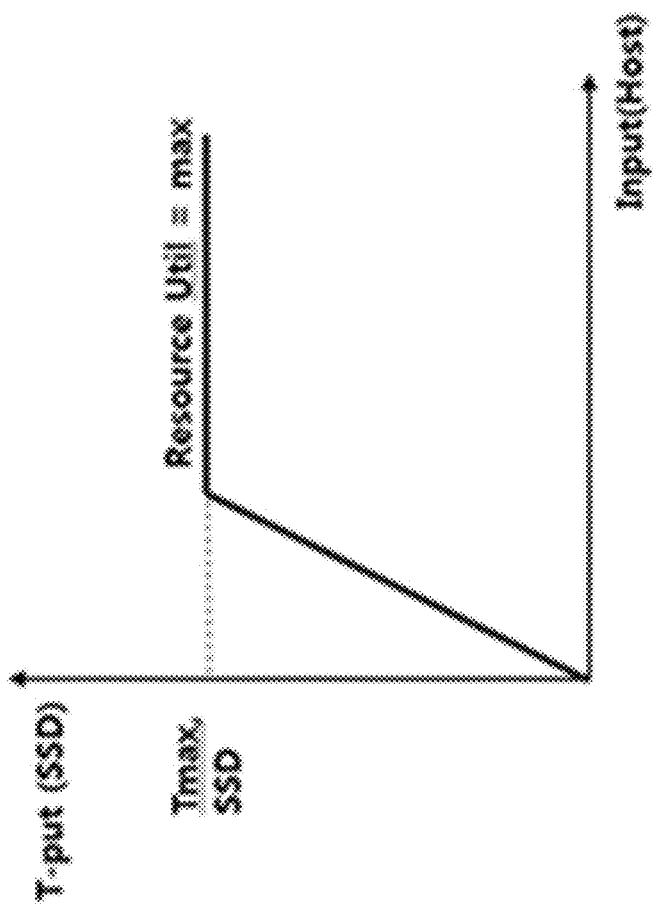
FIG. 3 illustrates an example plot of data throughput in a data storage device.

FIG. 3 illustrates an example plot of a throughput of a data storage device (e.g., SSD) versus the host input. Specifically, the plot illustrates a generic NVMe SSD throughput (MB/s) versus a host input workload. In some implementations, the host input may include a request, from a host, to the data storage device, for read and write operations. In some implementations, the host input may include data to be read from the data storage device, or to be written to the data storage device. The SSD throughput follows the host input as it increases until the SSD reaches its saturation point, which can be referred to as the maximum throughput (Tmax). The maximum throughput (Tmax) is usually determined by numerous resource limitations inside the SSD. If the resource is throughput sensitive and under-utilized, the maximum throughput (Tmax) decreases. By way of example and not by limitation, the host input workload may be a sequential write workload, and the throughput may indicate the sequential write throughput in MB/s. The buffer resource may include DRAM buffer size in bytes allocated to store host contexts temporarily before flushing to the NAND flash memory devices in the SSD.

Figure 4:
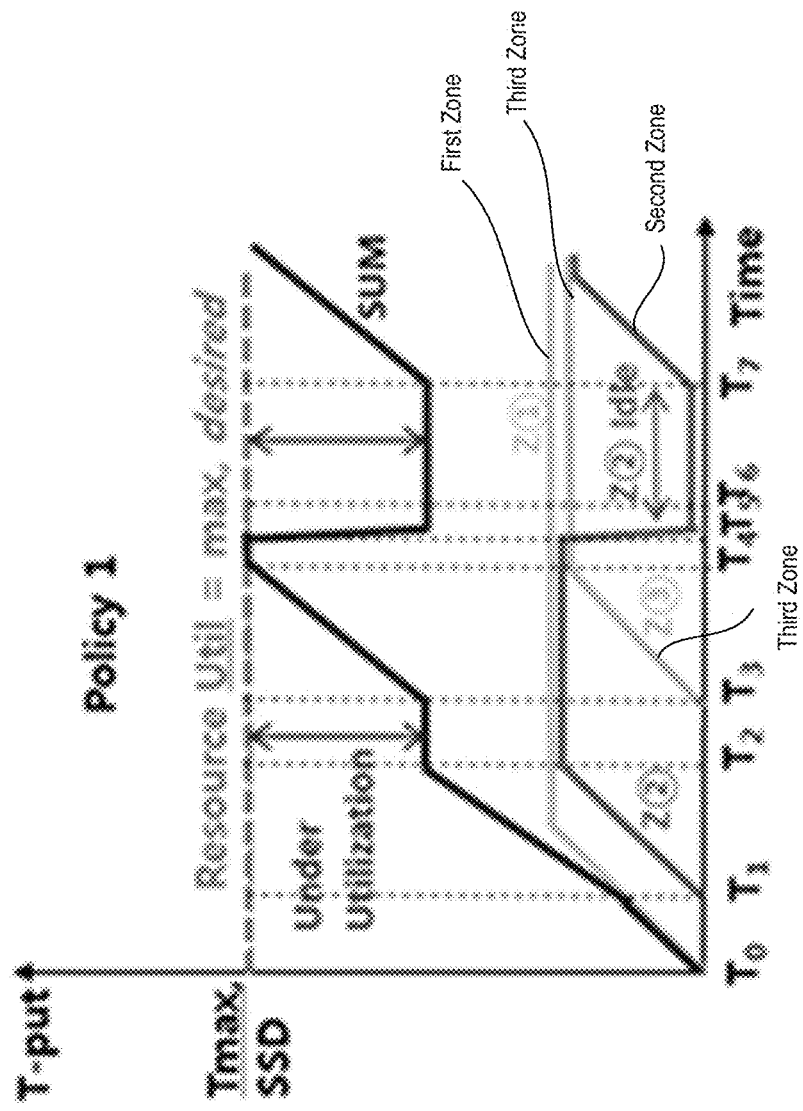
FIG. 4 illustrates example plots of data throughput in data storage device based on a fixed buffer or cache allocation scheme.

FIG. 4 illustrates an example plot of a throughput of a data storage device (e.g., SSD) versus the host input based on a fixed buffer or cache allocation scheme. However, a fixed buffer or cache allocation scheme may lead to a waste of buffer or cache resources as further explained below. Therefore, efficient buffer allocation becomes very important.

A data storage device such as SSD intends to achieve a peak sustained throughput by fully utilizing the buffer. If the buffer is full, the SSD cannot take any more workloads from the host, thereby reducing the SSD throughput until the buffer has sufficient space to accept further workloads by flushing the contexts to the NAND flash memory devices in the SSD. FIG. 4 illustrates such a scenario with up to three open zones. In this scenario, the entire buffer is to be shared by three open zones eventually. Policy 1 that is illustrated in FIG. 4 indicates an intuitive buffer sharing policy, where the buffer size for each open zone (total buffer size/number of open zones) is statically allocated as a fixed value up to the maximum number of open zones. At any moment, when there is a single open zone, the maximum throughput is bound by the buffer size (single Open Zone). Specifically, at T0, a first open zone (Open Zone 1) starts receiving the workload until it reaches the maximum throughput of a single zone between T1 and T2. At T1, a second open zone (Open Zone 2) starts receiving the workload. The combined throughput of first and second open zones (Open Zone 1 and Open Zone 2) will reach 2×Throughput (single Zone) maximum at T2, as illustrated by the "SUM" plot in FIG. 4. The combined throughput stays flat afterward until a third open zone (Open Zone 3) starts receiving the workload. During T2 and T3 periods, one-third of the buffer space is not utilized and the resulting throughput is less than its capability. At T5, the second open zone (Open Zone 2) has no more workloads from the host and it experiences an idle period (Idle). During this period, the buffer allocated to Open Zone 2 is not in use. Thus, such a fixed size buffer per zone of the policy 1 may result in wasting buffer or cache resources.

Figure 5:
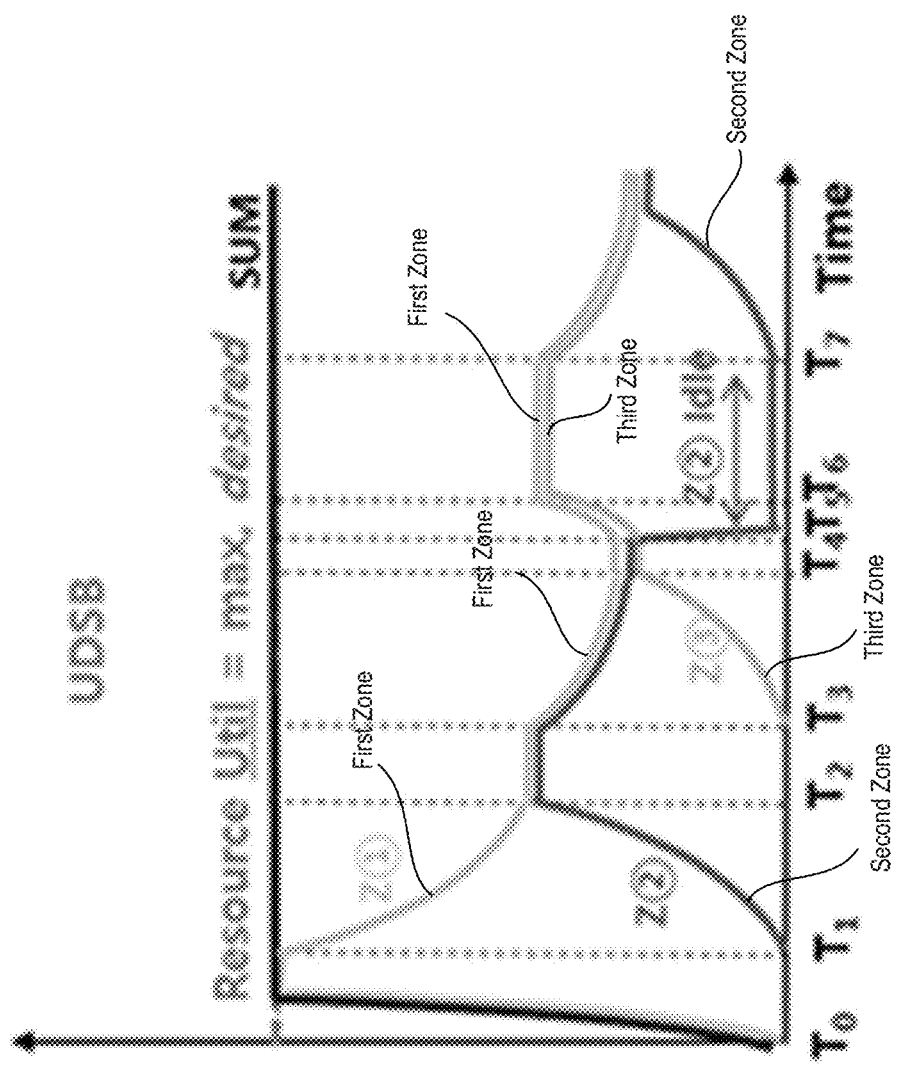
FIG. 5 illustrates example plots of data throughput in a data storage device based on some implementations of the disclosed technology.

FIG. 5 illustrates example plots a throughput of a data storage device (e.g., SSD) versus the host input based on some implementations of the disclosed technology.

Using the same nomenclature as in FIG. 4, between T0 and T1, only one zone (first zone; Z①) is open and active. The maximum available buffer space is allocated to the first zone to achieve the best possible throughput. At T1, a second zone (Z②) becomes open and active. The first zone yields half of its allocation to the second zone to maintain the fairness and the maximum aggregated throughput. At T5, the second zone temporarily becomes idle, and its resource is re-allocated to the other active zones to accommodate more workloads onto these zones. As indicated by the curve labeled with "SUM" in FIG. 5, the aggregate throughput of the SSD is maintained at its maximum while maintaining the fairness among the active zones.

Table 1 below provides an example algorithm that can be used to implement the method steps of a UBSD technique as disclosed herein.

TABLE 1

```
utilization_index(all open zones) = 0; //Initial condition.
Allocation_Rsvd = Max_Buffer_Allocation
 // utilization = 100%, if allocated buffer has been
 fully in use for the past interval.
 // 0%, if not used at all.
At every new command which needs a buffer allocation to
 the target zone if (first allocation for this zone){
  Buffer(target_zone) = Allocation_Step ;
  Allocation_Rsvd -= Allocation_Step ;
  //Allocation_Step is big enough for the major block size.
 }
 Update utilization_index for the selected zone.
At every re-allocation_interval // workload inspection interval
 if (Allocation_Rsvd > Allocation_Step){ //To allocate more
  target_zone = find_candidate_for_increase ( ).
  if (utilization_index (target_zone) > threshold_up)
   { //To allocate more Buffer(target_zone) += Allocation_Step ;
```

TABLE 1-continued

```
    // Zone (target) throughput may increase.
    Allocation_Rsvd -= Allocation_Step ;
   }
 }
 if (Allocation_Rsvd < Allocation_threshold)
 { //To re-claim if Rsvd is too small
  Find minimum utilization_index of all open
  zones to select a victim_zone.
  if (utilization_index (victim_zone) < threshold_down)
  { //Re-distribute the space to the others
   Buffer(victim_zone) -= Allocation_Step ;
   //Zone (victim) throughput may decrease.
   Allocation_Rsvd += Allocation_Step ;
  }
 }
find_candidate_for_increase( )
// Find a candidate zone to increase the buffer.
// A Zone with the highest utilization is a candidate.
// Any selection policy can be added when there are multiple
candidates with the highest utilization during the past interval.
// round-robin, weighted round-robin, per zone or per zone group, etc.
```

The methods for operating memory or data storage systems that include a server and a plurality of SSDs discussed in this patent document are applicable to SSDs such as NAND flash based Zoned Namespace SSDs and other SSDs using similar resource sharing schemes to support multi-tenant applications. In some implementations, the memory system or the data storage system may include SSDs equipped with a utilization detection capability. In some implementations, the memory system or the data storage system may include SSDs equipped with a performance sensitive DRAM buffer allocation capability based on the utilization detection. In some implementations, the memory system or the data storage system may include SSDs equipped with dynamically adjustable target parameters at regular intervals.

Figure 6:
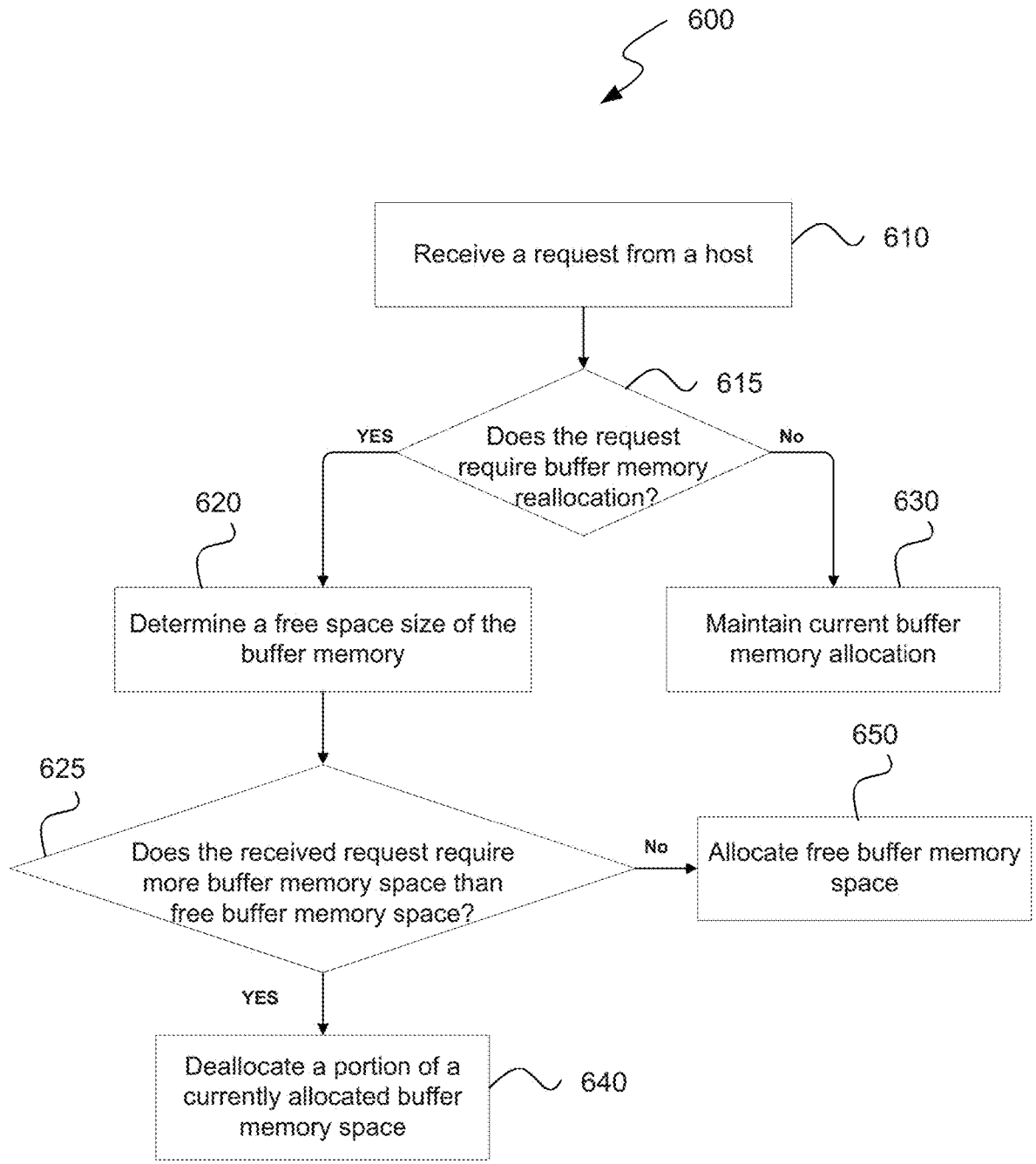
FIG. 6 is a flow diagram that illustrates an example of a utilization-based dynamic shared buffer algorithm based on some embodiments of the disclosed technology.

FIG. 6 is a flow diagram that illustrates a set of example operations for implementing a utilization-based dynamic shared buffer method based on some embodiments of the disclosed technology.

The method 600 includes, at 610, receiving a request from a host, at 615, determining whether the request requires a buffer memory reallocation. The method 600 includes, at 620, determining, upon a determination that the request requires a buffer memory reallocation, a free space size of the buffer memory. The method 600 includes, at 630, maintaining, upon a determination that the request does not require a buffer memory reallocation, the current buffer memory allocation. The method 600 includes, at 625, determining, upon a determination that the request requires a buffer memory reallocation, whether the received request requires more buffer memory space than a free buffer memory space. The method 600 includes, at 640, deallocating, upon a determination that the received request requires more buffer memory space than the free buffer memory space, a portion of a currently allocated buffer memory space. The method 600 includes, at 650, allocating, upon a determination that the received request does not require more buffer memory space than the free buffer memory space, the free buffer memory space to the received request.

Figure 7:
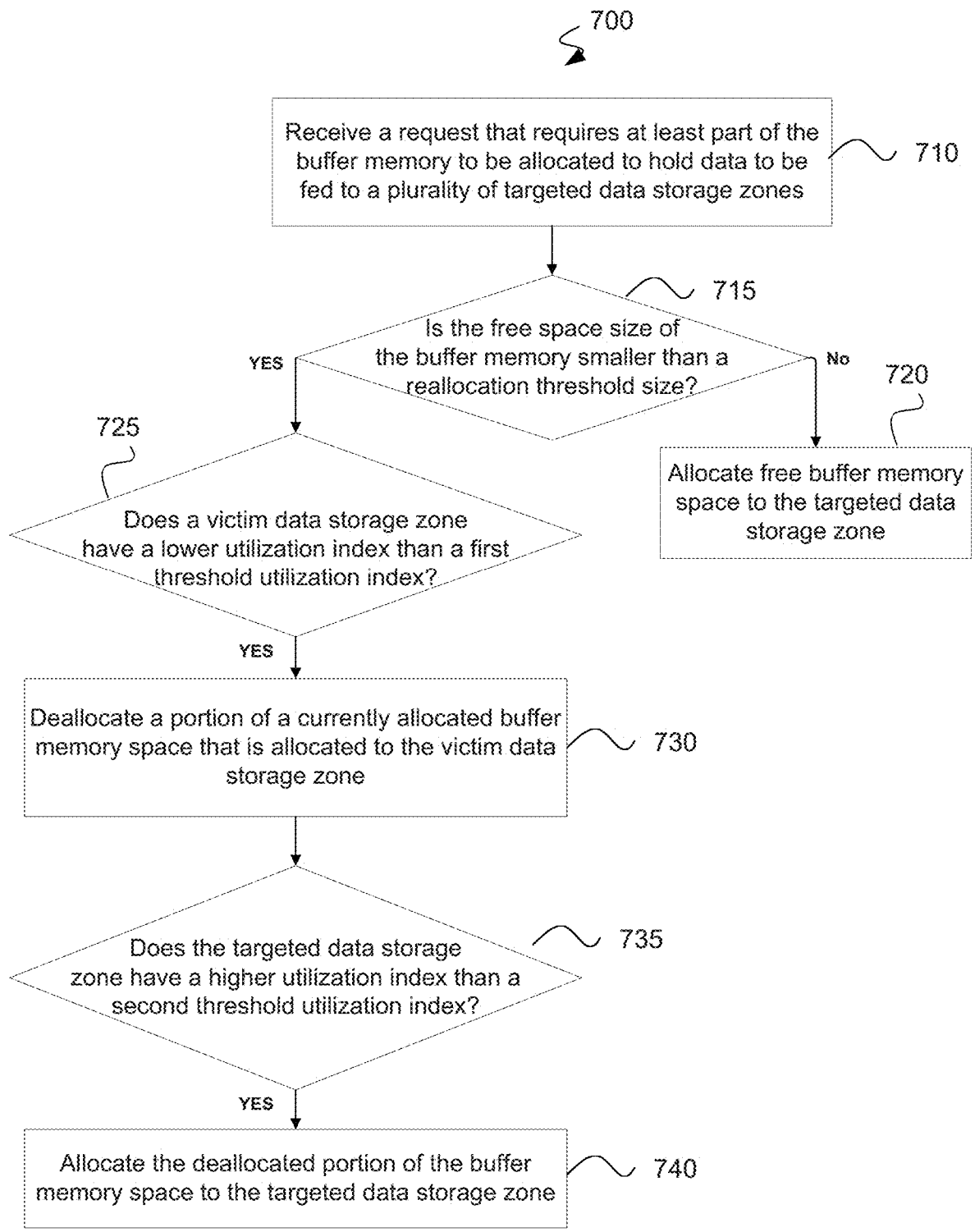
FIG. 7 is a flow diagram that illustrates another example of a utilization based dynamic shared buffer algorithm based on some embodiments of the disclosed technology.

FIG. 7 is a flow diagram that illustrates a set of example operations for implementing a utilization-based dynamic shared buffer method based on some embodiments of the disclosed technology.

The method 700 includes, at 710, receiving a request for allocation of at least part of the buffer memory to hold data to be fed to a plurality of first data storage zones. The method 700 includes, at 715, determining whether the free space size of the buffer memory is smaller than a reallocation threshold size. The method 700 includes, at 720, allocating, upon a determination that the free space size of the buffer memory is not smaller than the reallocation threshold size, a free buffer memory space to the targeted data storage zone. The method 700 includes, at 725, determining, upon a determination that the free space size of the buffer memory is smaller than the reallocation threshold size, whether a victim data storage zone has a lower utilization index than a first threshold utilization index. The method 700 includes, at 730, deallocating, upon determination that the victim data storage zone has a lower utilization index than the first threshold utilization index, a portion of a currently allocated buffer memory space that is allocated to the victim data storage zone. The method 700 includes, at 735, determining whether the targeted data storage zone has a higher utilization index than a second threshold utilization index. The method 700 includes, at 740, allocating, upon determination that the targeted data storage zone has a higher utilization index than the second threshold utilization index, the deallocated portion of the buffer memory space to the targeted data storage zone.

Figure 8:
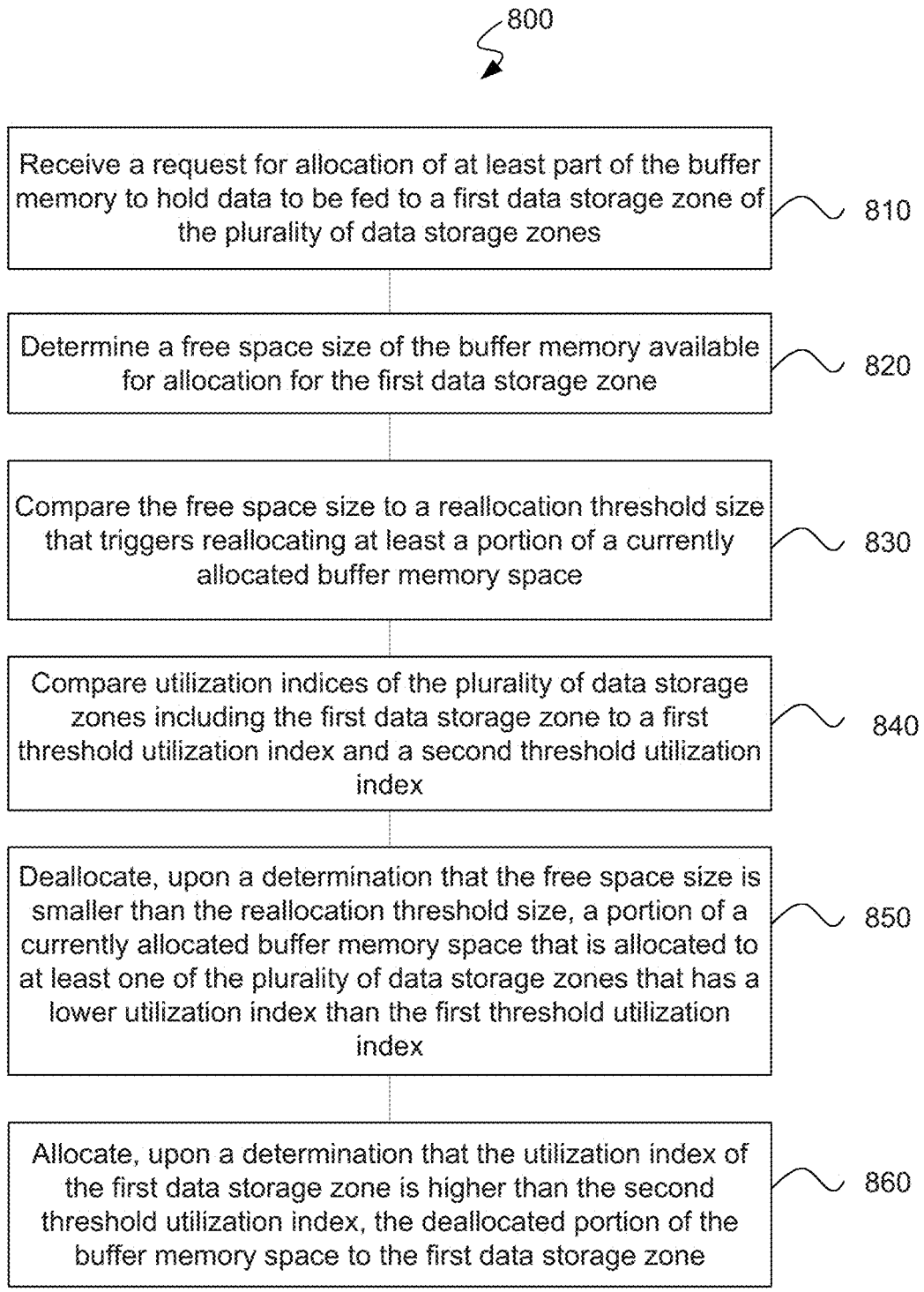
FIG. 8 is a flow diagram that illustrates another example of a utilization based dynamic shared buffer algorithm based on some embodiments of the disclosed technology.

FIG. 8 is a flow diagram that illustrates a set of example operations for implementing a utilization-based dynamic shared buffer method based on some embodiments of the disclosed technology.

The method 800 includes, at 810, receiving a request for allocation of at least part of the buffer memory to be allocated to hold data to be fed to a targeted data storage zone. The method 800 includes, at 820, determining a free space size of the buffer memory available for allocation for the targeted data storage zone. The method 800 includes, at 830, comparing the free space size to a reallocation threshold size that requires reallocating at least a portion of a currently allocated buffer memory space. The method 800 includes, at 840, comparing utilization indices of the plurality of data storage zones including the targeted data storage zone to a first threshold utilization index. The method 800 includes, at 850, deallocating, upon a determination that the free space size is smaller than the reallocation threshold size, a portion of a currently allocated buffer memory space that is allocated to at least one of the plurality of data storage zones that has a lower utilization index than the first threshold utilization index. The method 800 includes, at 860, allocating, upon a determination that the utilization index of the first data storage zone is higher than the second threshold utilization index, the deallocated portion of the buffer memory space to the first data storage zone.

Figure 9:
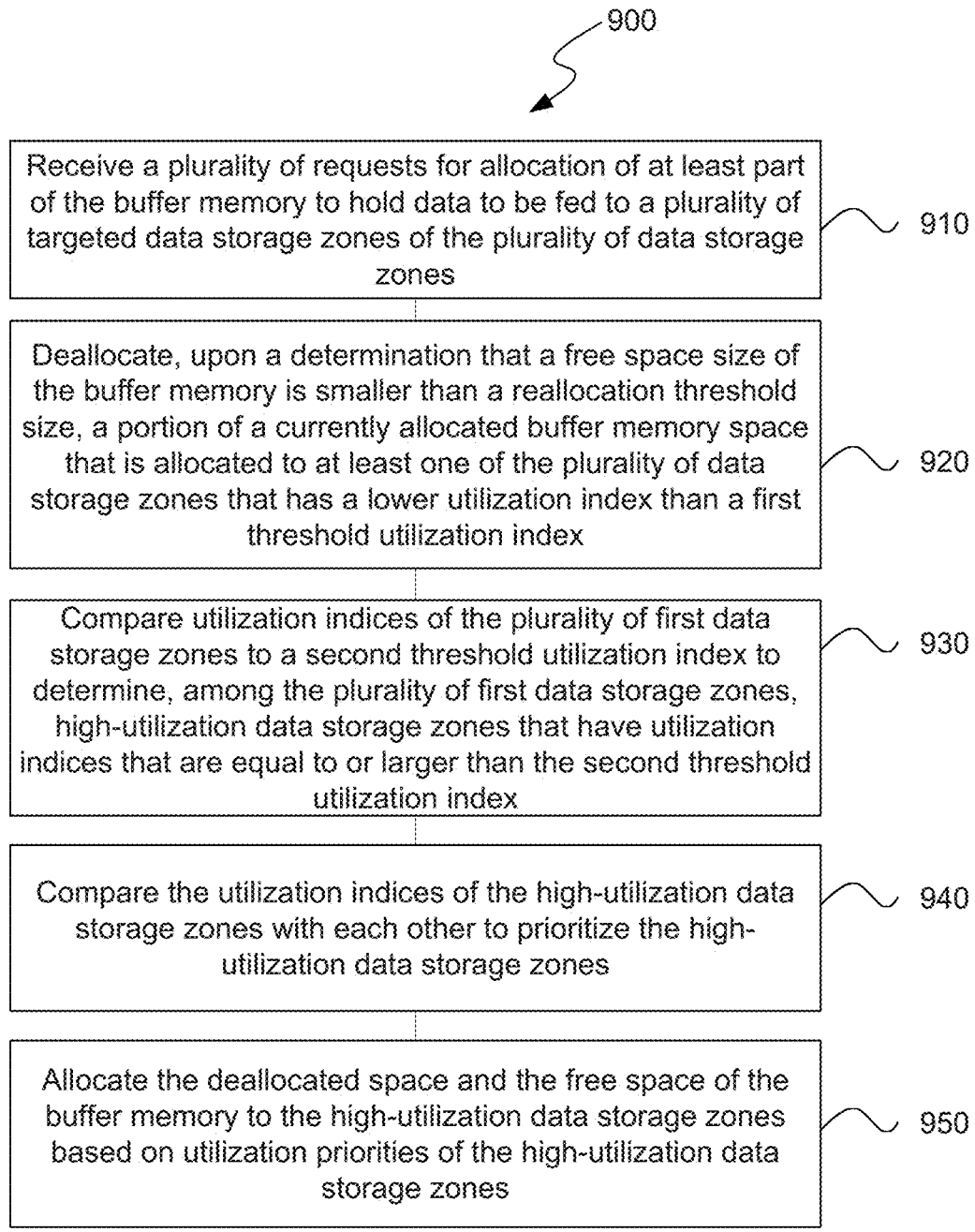
FIG. 9 is a flow diagram that illustrates another example of a utilization based dynamic shared buffer algorithm based on some embodiments of the disclosed technology.

FIG. 9 is a flow diagram that illustrates a set of example operations for implementing a utilization-based dynamic shared buffer method based on some embodiments of the disclosed technology.

The method 900 includes, at 910, receiving a plurality of requests for allocation of at least part of the buffer memory to be allocated to hold data to be fed to a plurality of first data storage zones of the plurality of data storage zones. The method 900 includes, at 920, deallocating, upon a determination that a free space size of the buffer memory is smaller than a reallocation threshold size, a portion of a currently allocated buffer memory space that is allocated to at least one of the plurality of data storage zones that has a lower utilization index than a first threshold utilization index. The method 900 includes, at 930, comparing utilization indices of the plurality of first data storage zones to a second threshold utilization index to determine, among the plurality of first data storage zones, high-utilization data storage zones that have utilization indices that are equal to or larger than the second threshold utilization index. The method 900 includes, at 940, comparing the utilization indices of the high-utilization data storage zones with each other to prioritize the high-utilization targeted data storage zones. The method 900 includes, at 950, allocating the deallocated space and the free space of the buffer memory to the high-utilization data storage zones based on utilization priorities of the high-utilization data storage zones.

Figure 10:
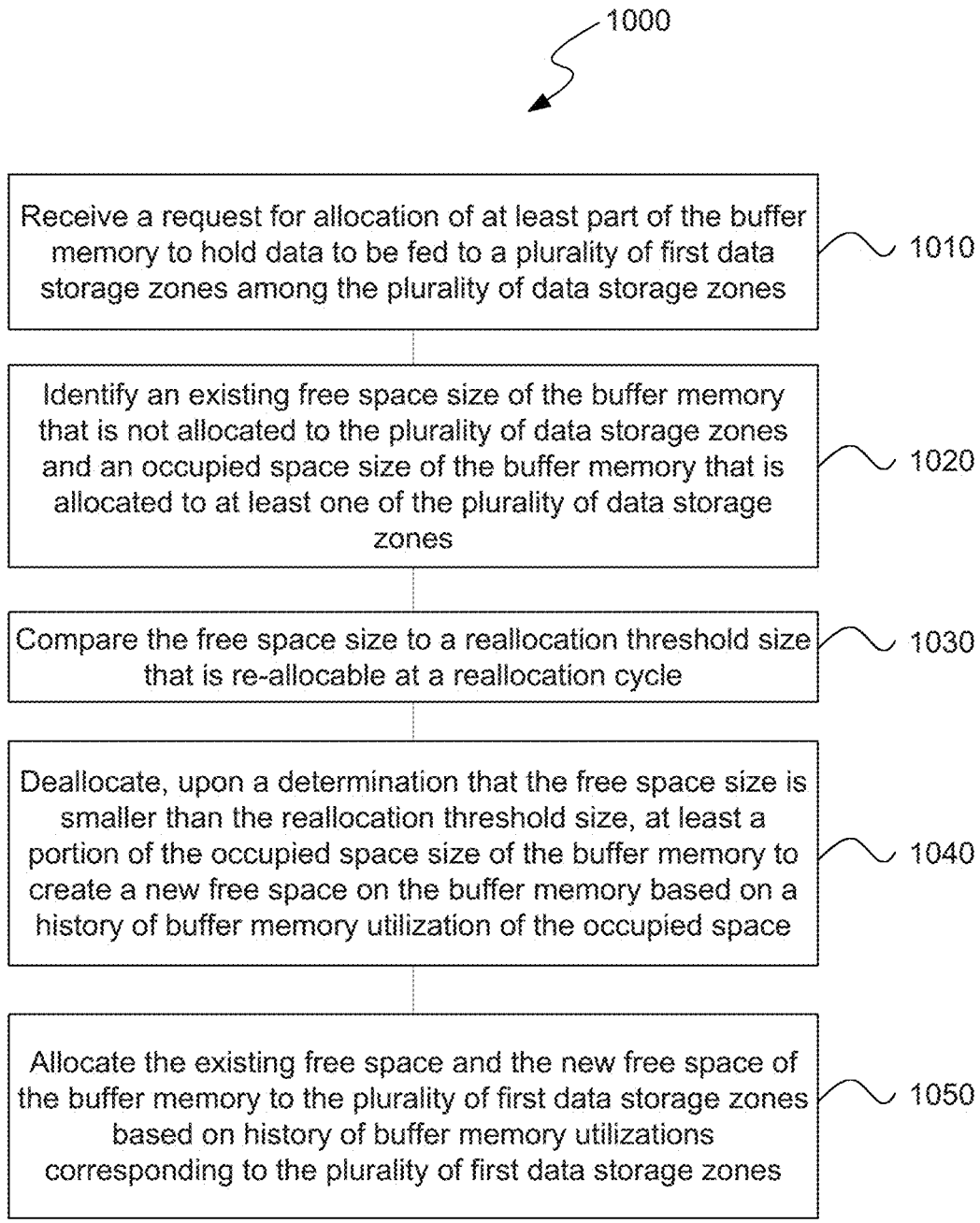
FIG. 10 is a flow diagram that illustrates another example of a utilization based dynamic shared buffer algorithm based on some embodiments of the disclosed technology.

FIG. 10 is a flow diagram that illustrates a set of example operations for implementing a utilization based dynamic shared buffer algorithm based on some embodiments of the disclosed technology.

The method 1000 includes, at 1010, receiving a request for allocation of at least part of the buffer memory to hold data to be fed to a plurality of first data storage zones among the plurality of data storage zones. The method 1000 includes, at 1020, identifying an existing free space size of the buffer memory that is not allocated to the plurality of data storage zones and an occupied space size of the buffer memory that is allocated to at least one of the plurality of data storage zones. The method 1000 includes, at 1030, comparing the free space size to a reallocation threshold size that is re-allocable at a reallocation cycle. The method 1000 includes, at 1040, deallocating, upon a determination that the free space size is smaller than the reallocation threshold size, at least a portion of the occupied space size of the buffer memory to create a new free space on the buffer memory based on history of buffer memory utilizations of the occupied space. The method 1000 includes, at 1050, allocating the existing free space and the new free space of the buffer memory to the plurality of first data storage zones based on history of buffer memory utilizations corresponding to the plurality of first data storage zones.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of allocating a buffer memory to a plurality of data storage zones of a data storage system, the method comprising:
    receiving a request for allocation of at least part of the buffer memory to hold data to be fed to a first data storage zone of the plurality of data storage zones;
    determining a free space size of the buffer memory available for allocation for the first data storage zone;
    comparing the free space size to a reallocation threshold size that triggers reallocating at least a portion of a currently allocated buffer memory space;
    comparing utilization indices of the plurality of data storage zones including the first data storage zone to a first threshold utilization index for deallocating a currently allocated buffer memory space and a second threshold utilization index for allocating a deallocated buffer memory space;
    deallocating, upon a determination that the free space size is smaller than the reallocation threshold size, a portion of a currently allocated buffer memory space that is allocated to at least one of the plurality of data storage zones that has a lower utilization index than the first threshold utilization index; and
    allocating, upon a determination that the utilization index of the first data storage zone is higher than the second threshold utilization index, the deallocated portion of the buffer memory space to the first data storage zone,
    wherein the first and second threshold utilization indices have different values from each other.

2. The method of claim 1, wherein the first and second threshold utilization indices are determined based on history of buffer memory utilizations corresponding to the plurality of data storage zones.

3. The method of claim 1, wherein the utilization indices of the plurality of data storage zones are updated based on utilization rates of portions of the buffer memory allocated to the plurality of data storage zones.

4. The method of claim 1, further comprising, upon a determination that the free space size is equal to or larger than the reallocation threshold size, allocating a free buffer memory space corresponding to the free space size to the one or more of the plurality of data storage zones on which the one or more requests are queued to run at a reallocation cycle.

5. The method of claim 1, wherein the reallocation threshold size corresponds to a predetermined buffer memory size that is smaller than a total size of the buffer memory and is set to be re-allocable at a reallocation cycle.

6. The method of claim 5, wherein the reallocation cycle is periodically repeated.

7. The method of claim 1, wherein the utilization indices of the plurality of data storage zones include a percentage of the currently allocated buffer memory space that is in use or has been in use.

8. A method of allocating a buffer memory to a plurality of data storage zones of a data storage system, the method comprising:
    receiving a plurality of requests for allocation of at least part of the buffer memory to hold data to be fed to a plurality of first data storage zones of the plurality of data storage zones;
    deallocating, upon a determination that a free space size of the buffer memory is smaller than a reallocation threshold size, a portion of a currently allocated buffer memory space that is allocated to at least one of the plurality of data storage zones that has a lower utilization index than a first threshold utilization index for deallocating a currently allocated buffer memory space;
    comparing utilization indices of the plurality of first data storage zones to a second threshold utilization index for allocating a deallocated buffer memory space to determine, among the plurality of first data storage zones, high-utilization data storage zones that have utilization indices that are equal to or larger than the second threshold utilization index;
    comparing the utilization indices of the high-utilization data storage zones with each other to prioritize the high-utilization data storage zones; and
    allocating the deallocated space and the free space of the buffer memory to the high-utilization data storage zones based on utilization priorities of the high-utilization data storage zones,
    wherein the first and second threshold utilization indices have different values from each other.

9. The method of claim 8, wherein the reallocation threshold size corresponds to a predetermined buffer memory size that is smaller than a total size of the buffer memory and is set to be re-allocable at a reallocation cycle.

10. The method of claim 8, wherein the utilization indices of the plurality of first data storage zones are determined based on utilization rates of portions of the buffer memory allocated to the plurality of data storage zones.

11. The method of claim 8, wherein the first and second indices are determined based on history of buffer memory utilizations corresponding to the plurality of data storage zones.

12. The method of claim 8, wherein the allocating of the deallocated space and the free space of the buffer memory includes allocating the deallocated space and the free space of the buffer memory to a data storage zone that has a highest utilization rate among the high-utilization data storage zones.

13. A data storage system, comprising:
a data storage device including a plurality of data storage zones configured to store data;
a buffer memory configured to be shared by the plurality of data storage zones to temporarily store the data before the data is written to the data storage device; and
a processor in communication with the data storage device and the buffer memory to:
receive a request for allocation of at least part of the buffer memory to hold data to be fed to a plurality of first data storage zones among the plurality of data storage zones;
identify an existing free space size of the buffer memory that is not allocated to the plurality of data storage zones and an occupied space size of the buffer memory that is allocated to at least one of the plurality of data storage zones;
compare the free space size to a reallocation threshold size that is re-allocable at a reallocation cycle;
deallocate, upon a determination that the free space size is smaller than the reallocation threshold size and upon a determination that a first threshold utilization index for deallocating a currently allocated buffer memory space is lower than the first threshold utilization index, at least a portion of the occupied space size of the buffer memory to create a new free space on the buffer memory based on a history of buffer memory utilization of the occupied space; and
allocate, upon a determination that the utilization index of the plurality of first data storage zones is higher than a second threshold utilization index for allocating a deallocated buffer memory space, the existing free space and the new free space of the buffer memory to the plurality of first data storage zones based on history of buffer memory utilizations corresponding to the plurality of first data storage zones,
wherein the first and second threshold utilization indices have different values from each other.

14. The system of claim 13, wherein the history of buffer memory utilizations of the occupied space includes utilization rates of portions of the buffer memory previously allocated to the plurality of data storage zones.

15. The system of claim 13, wherein the occupied space size is deallocated upon a determination that a previous utilization of the occupied space is lower than a threshold utilization value.

16. The system of claim 13, wherein the history of buffer memory utilizations corresponding to the plurality of first data storage zones includes utilization rates of portions of the buffer memory previously allocated to the plurality of first data storage zones.

17. The system of claim 13, wherein the existing free space and the new free space of the buffer memory are allocated to the plurality of first data storage zone upon a determination that a previous utilization of the buffer memory associated with the plurality of first data storage zone is higher than a threshold utilization value.

18. The method of claim 13, wherein the reallocation cycle is periodically repeated.

* * * * *